United States Patent [19]

Werth, Jr.

[11] 4,350,054

[45] Sep. 21, 1982

[54] REMOTELY CONTROLLED TOOL ARM ASSEMBLY

[75] Inventor: Carl H. Werth, Jr., Bridgeport, Mich.

[73] Assignee: Werth Engineering Inc., Bridgeport, Mich.

[21] Appl. No.: 135,497

[22] Filed: Mar. 31, 1980

[51] Int. Cl.³ .................... F16H 27/02; F16H 31/00
[52] U.S. Cl. ........................................ 74/128; 74/160
[58] Field of Search ................ 74/126, 128, 129, 142, 74/143, 160, 161, 578; 82/36 R

[56] References Cited

U.S. PATENT DOCUMENTS

| 148,871 | 3/1874 | Brown | 74/160 |
|---|---|---|---|
| 1,446,267 | 2/1923 | Newcomb | 74/128 |
| 2,323,840 | 7/1943 | Obszarny | 74/142 |
| 3,190,152 | 6/1965 | Werth | 408/16 |
| 3,203,266 | 8/1965 | Willis et al. | 74/128 |
| 3,232,153 | 2/1966 | Davis | 407/9 |

FOREIGN PATENT DOCUMENTS

| 963973 | 7/1964 | United Kingdom | 74/128 |
|---|---|---|---|
| 985072 | 3/1965 | United Kingdom | 74/128 |
| 47709 | 9/1977 | U.S.S.R. | 74/128 |

*Primary Examiner*—Lawrence J. Staab
*Attorney, Agent, or Firm*—Learman & McCulloch

[57] ABSTRACT

A tool arm assembly adapted to be supported on a machine tool adjacent a workpiece rotating spindle has a tool carrier mount on a flexible, deformable portion; a bi-directional actuator for operating manually adjustable motion transmission means is operated by a remotely controlled motor device which normally is out of operating engagement with the actuator so that the motion transmission means can be adjusted manually.

13 Claims, 3 Drawing Figures

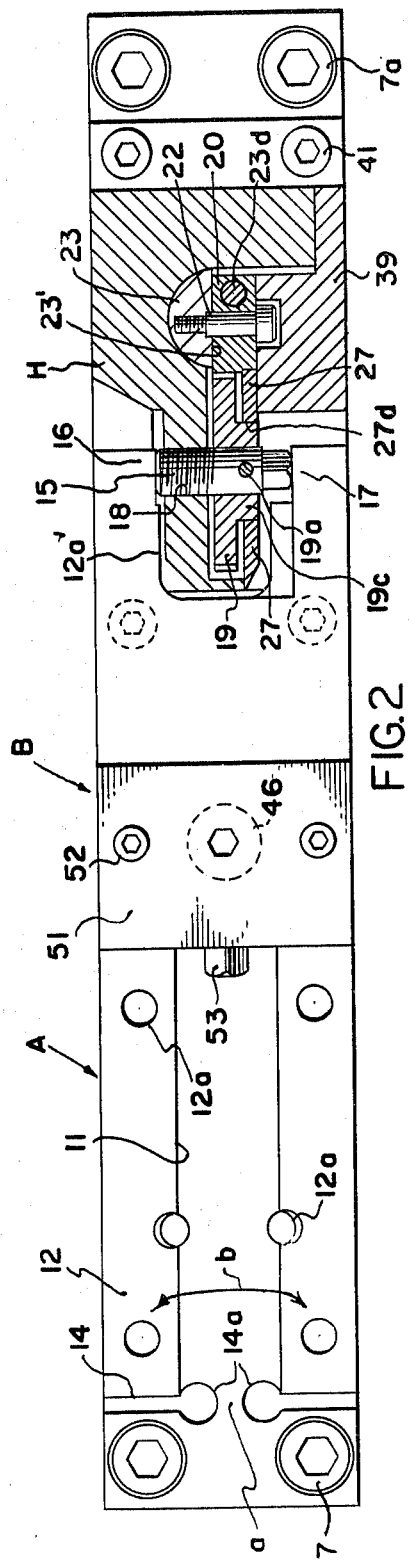
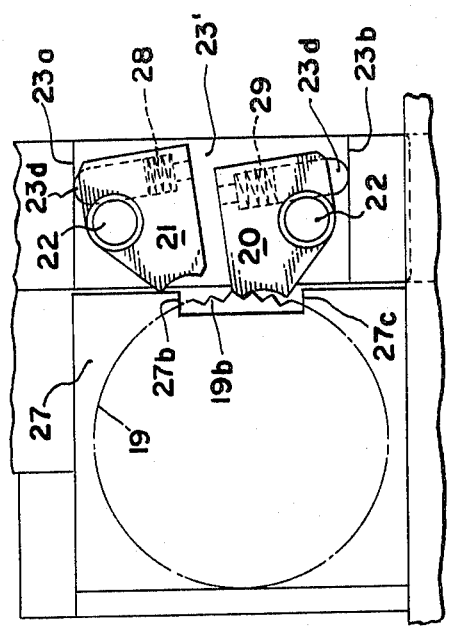
FIG.2
FIG.3

4,350,054

REMOTELY CONTROLLED TOOL ARM ASSEMBLY

BACKGROUND OF THE INVENTION

The present invention relates to tool arm assemblies of the character disclosed in U.S. Pat. Nos. 3,190,152; 3,812,747; and 3,232,153, and more particularly to certain novel and important improvements therein which increase the accuracy and reliability of such tool arm assemblies. Tool arm assemblies of this type adjust for wear of the tool in use and constructions such as shown in U.S. Pat. Nos. 3,877,329 and 3,793,708 provide for replacement of the cutter.

The present assignee's prior patent 3,812,747 discloses a remotely controlled tool arm assembly where a cam is utilized with a stepping motor to incrementally advance the tool bar and tool via a follower arm. The present tool arm assembly, wherein a remotely controlled tool bar position adjusting mechanism is utilized which is manually overridable, is considered to be a significantly improved mechanism for transmitting precise incremental motions with dependable accuracy in the range of several ten thousands of an inch.

One of the prime objects of the present invention is to provide a remotely controlled, mechanically operated, manually overridable tool arm assembly which avoids the use of stepping motors.

Another object of the invention is to provide a tool arm assembly of this character which is rugged, very serviceable, and more economical to manufacture.

Still a further object of the invention is to provide a tool arm mechanism of the character described which accomplishes motion transmission in a manner to avoid the possibility of a back-lash error.

SUMMARY OF THE INVENTION

A tool arm assembly, has a tool carrier with a flexible, deformable portion and motion transmission means operatively connected to adjust the position of the deformable portion relative to the base and the workpiece rotating spindle, and thereby adjust the position of the tool relative to the workpiece. A bi-directional actuator is provided to move the motion transmission mechanism in precise increments in either direction, but the motor mechanism for moving the actuator is normally out of operating engagement with the actuator so that it can be manually overridden.

Other objects and advantages of the invention will be pointed out specifically or will become apparent from the following description when it is considered in conjunction with the appended claims and the accompanying drawings, wherein:

FIG. 2 is a partly sectional top plan view of the improved tool arm assembly taken on the line 2—2 of FIG. 1; and FIG. 3 is an enlarged fragmentary side elevational view, illustrating another position of the air pressure controlled pawl motor drvice, for adjusting the position of the flexing portion of the tool arm assembly.

Figure 1:
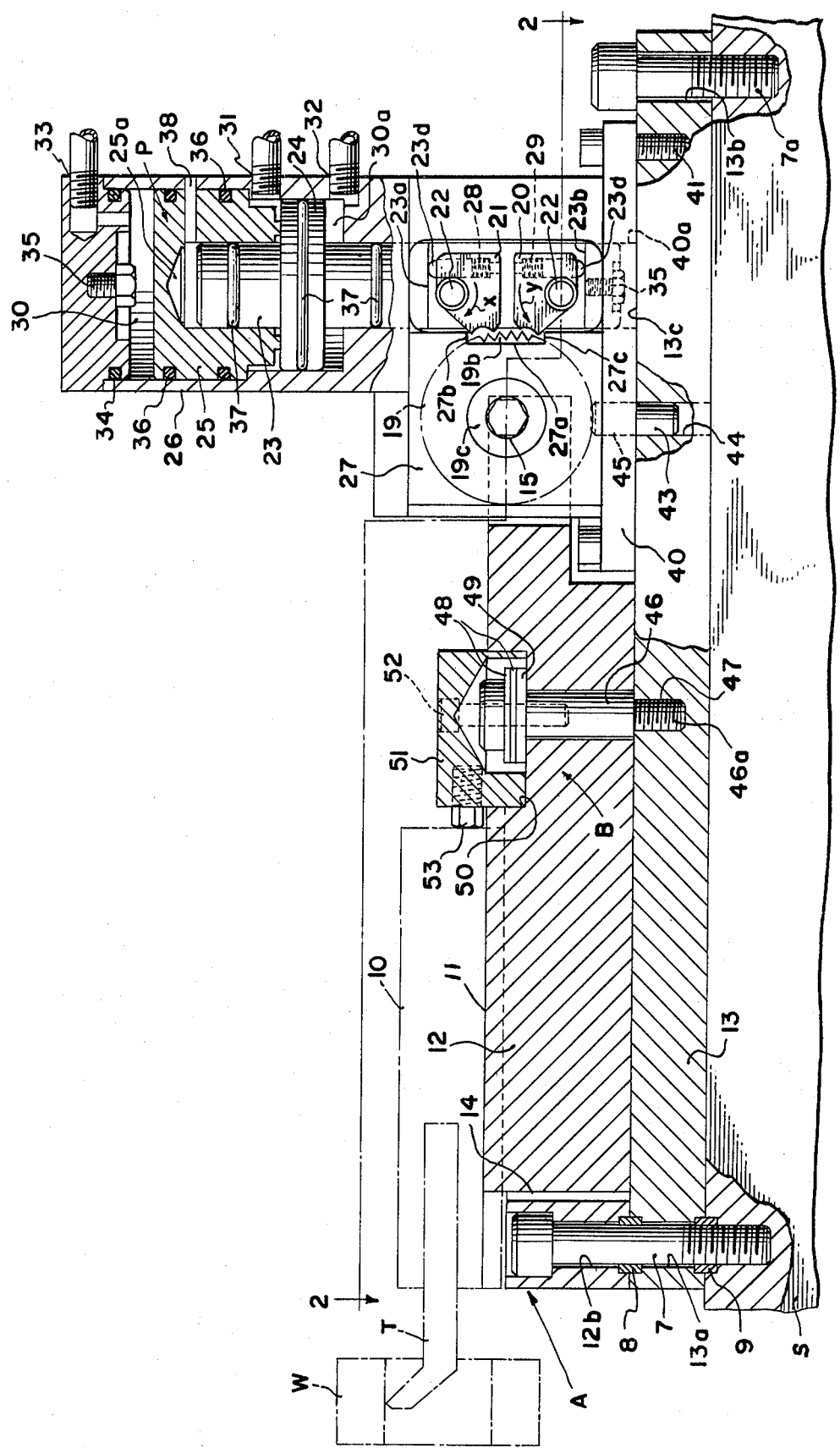
FIG. 1 is a partly sectional, side elevational view, with a housing cover plate removed to expose certain of the operating parts, and showing a tool bar and tool, the position of the tool being rotated 90° on the assembly to illustrate machining of the workpiece.

Referring now more particularly to the accompanying drawings in which I have disclosed my improved tool arm assembly A, a cutting tool T is mounted on a tool support bar 12 in the usual manner for machining the internal diameter of a workpiece W. The tool support bar 10 has a groove receiving a key 11 in an adjustable spring steel bar 12 mounted to a machine tool slide S by a mounting plate 13. Bolts extending through openings 12a retain bar 10 in position. The bar 12 has opposing keyhole slots 14, and, with the heads 14a of slots 14 and in opposed relation, and closely spaced apart, a flex point area a is provided about which the right end of tool T can be moved. Slots 14 permit the deformation of the bar 12, and a corresponding "diameter adjusting" movement of tool T, in the direction of the arc b shown in FIG. 2. Deformation, or easing thereof to adjust the position of tool T, can be caused by a screw member 15 exerting pressure against the pressure pad 16, or the opposed pressure pad 17, provided by bifurcating the rear portion 12a' of resilient bar 12. To turn the screw 15 in a manner which will be presently described, a ratchet wheel 19 is provided. The screw 15 has a bolt head permitting its manual adjustment also.

Provided to mount the tool arm assembly A to the machine tool slide S are front bolts 7, extending through openings 12b in bar 12 and 13a in plate 13, and rear bolts 7a extending through openings 13b in plate 13. It will be noted that transversely disposed keys 8 and 9 are provided at the front end of the arm assembly A, locking flex plate 12 and base 13, and the base plate 13 and slide S, respectively, against torsional twisting. The construction permits torsional twisting of the flex plate 12 about the flex point a, while otherwise maintaining the rigidity of the tool arm structure.

As indicated the ratchet wheel 19, which is pinned as at 19a to the axially adjustable screw 15 which cooperates with the threads 18 provided on a housing member, generally designated H, which will be more particularly described. It is to be observed that the teeth 19b of the rachet wheel 19 are configured for bi-directional actuators (FIG. 3) and the purpose of this is to provide for actuation of the wheel 19 in either direction of rotation, for the purpose of moving screw 15 in either direction as required.

Mounted on the inner piston member 23 of a piston assembly generally designated P, and operable to advance the ratchet wheel 19 in either direction, are a pair of bell crank ratchet pawls 20 and 21. The pawls 20 and 21 are pivotally secured to piston member 23 by means of shoulder bolts 22. It will be noted that the inner piston 23 has an enlarged portion or flange 24 and that, at its upper end, piston 23 is received within a larger diameter piston 25, received within cylinder 26. In FIG. 1 the pawls 20 and 21 are shown in a neutral position in which they are not operatively engaging the ratchet wheel teeth 19b. Provided in the plane of pawls 20 and 21 (FIG. 1) is a housing side plate member 27 which, at its rear end, is recessed as at 27a to provide an upper shoulder 27b and a lower shoulder 27c. It is also recessed as at 27d to receive and journal the hub 19c of wheel 19. Spring members 28 and 29 normally urge the pawls 21 and 20 to pivot toward the ratchet wheel teeth 19b and against shoulders 27b and 27c. When the pawls 20 and 21 are in the FIG. 1 position, engaging shoulders 27b and 27c, they are cammed by the shoulders 27b and 27c to a neutral or non-tooth engaging position. The inner piston member 23, in the vicinity of the pawls 20 and 21, is recessed as at 23' to receive pawls 20 and 21 and provide shoulders 23a and 23b. Pins 23d, bearing against the shoulders 23a and 23b, restrain the springs 28 and 29 which tend to pivot the pawls 20 and 21 in the direction of the arrows shown in FIG. 1 at x and y.

Air pressure normally applied to the end of piston 25 at 30 and to the piston flange 24 at 30a normally maintains the pawls 20 and 21 in the neutral or non-tooth engaging position. The air inlet ports, provided in cylinder 26, are shown at 31, 32, and 33, and air pressure is selectively applied to these ports from an air supply system which includes a conventional spring returned four-way valve (not shown).

Provided in the cylinder 26 is the usual O-ring seal 34, and provided at the upper end of cylinder 26 and in the lower end of piston 23 are axially adjustable stop pins 35 which are preadjusted axially to precise position to avoid any back-lash condition. The upper stop button is in position to be engaged by piston 25 and the lower stop button 35 is in position to engage the base plate 13 at 13c, the base flange 40 of housing H, which is bolted to the base plate 13 as at 41, being bored as at 40a to accommodate the lower end of piston 23. Piston 25 carries the seal rings 36, and inner piston 23 carries the usual seal rings 37.

To aid the sealing function of the O-rings 36, a vent-out port 38 is provided as shown at the upper end of inner piston cylinder 25a. Provided as a part of the cylinder housing 26 is a cover plate member 39 which is used to keep the pawls 20 and 21 in planar alignment with the ratchet wheel 19. To add rigidity to the structure, a dowel pin 43 is provided in an opening 44 in base plate 13 and an opening 45 in cylinder base flange 40, to prevent any movement of the air cylinder housing 26 under the influence of screw 15 movement.

Finally, and provided as a further hold-down device to positively prevent any vertical movement of flex bar 12 relative to base plate 13, is a shoulder bolt assembly generally designated B, which includes shoulder bolt 46 having a threaded lower end 46a received in threaded opening 47 in base plate 13. Spring washers 48 and a thrust washer 49 are provided in a recess 50 provided in the flex bar 12. A tool bar-backing block 51 received in recess 50 also serves as a cover for the shoulder bolt assembly B. The block 51 is retained in the recessed opening 50 by means of bolts 52, and at its front end carries an axially adjustable stop screw 53 which abuts the tool carrying member 10 and functions to determine the rear position of tool bar 10.

In operation, when it is desired to move the tool T in one direction along arc b, the air pressure at location 30 is relieved and piston 25, along with piston 23, to which each of the pawls 20 and 21 is mounted, moves upwardly. When this occurs pawl 21 is cammed further out of the way by shoulder 27b, while pawl 20 is forced by its spring 29 into engagement with one of the pawl wheel teeth and moves it one notch to turn the ratchet wheel 19 one increment in the counterclockwise direction (FIG. 1). With the reinstitution of pressure at location 30, pistons 25 and 23 are returned downwardly and pawls 20 and 21 are are returned to the neutral position.

If the tool T is to be adjusted in the opposite direction, the piston assembly is vented at location 30a and pressure is introduced through inlet 31 to move piston 23 downwardly. Shoulder 27c cams pawl 20 further out of the way, while the spring 28 forces pawl 21 into engagement with the ratchet wheel teeth 19b of the ratchet wheel 19 to rotate pawl wheel 19 one increment in the clockwise direction. Again, after relieving the pressure at 31, and re-instituting the pressure at 32, piston 23 is restored to the neutral position in which it is shown in FIG. 1. The air pressure to move the pistons is remotely controlled by an operator who can simply hit a switch button operating the air valve mentioned. The position of stops 35 is extremely important because the piston assembly must only move sufficiently axially such that one full tooth is properly engaged by either of the pawls 20 or 21 and precisely the same increment of rotation is imparted to ratchet wheel 19 each time the pawls 20 or 21 are actuated to operate ratchet wheel 19. The amount of movement each time must be of one full tooth in extent. Because the pawls 20 and 21 are normally in a "neutral" position out of operating engagement with wheel 19, the system is manually overrideable and bolt 15 can be turned independently of any movement of piston 23.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In a tool arm assembly having a longitudinally extending base means adapted to be supported on a machine tool adjacent a workpiece rotating spindle, a tool carrier means mounted on the base means and having a position adjustable portion adapted to support the tool; and motion transmission means operatively connected to adjust the position of the portion relative to the base means and spindle and thereby adjust the position of the tool relative to the workpiece;

the improvement wherein a multi-toothed, bi-directional actuator movable in precise increments in opposite directions, is provided on the assembly to operate the motion transmission means; intermittently driven toothed means is carried by the base means for movement in a path of travel for moving the actuator incrementally in either direction; and cam means on the base means mounted in the path of movement of said toothed means coacts with the toothed means to determine in which direction the actuator is driven.

2. The improved combination set forth in claim 1 wherein the actuator comprises a ratchet wheel on a shaft assembly carried crosswisely on the base means; and the shaft assembly comprises a manually adjustable threaded member adjusting the position of the flexible deformable tool supporting portion.

3. The improved combination of claim 1 in which the motor means includes a piston-cylinder assembly which comprises a main cylinder mounting a tubular piston, an inner piston is provided within the tubular piston; and an actuator operator assembly comprising a portion of said motor means is carried by the inner piston and is engageable with the actuator to move it selectively in either direction; there being port means communicating with opposite ends of the tubular piston and the inner piston permitting the application of a differential pressure to move the operator assembly selectively in either direction.

4. The improved combination of claim 3 which includes stop means associated with the tubular piston and the inner piston to prevent movement of the actuator of more than one actuator tooth in extent.

5. In a tool arm assembly having a longitudinally extending base means adapted to be supported on a machine tool adjacent a workpiece rotating spindle, a tool carrier means mounted on the base means and having a position adjustable portion adapted to support the tool; and motion transmission means operatively connected to adjust the position of the said portion relative to the base means and spindle and thereby adjust the position of the tool relative to the workpiece;

the improvement wherein a multi-toothed, bi-directional actuator, movable in precise increments in opposite directions, is provided on the assembly to operate the motion transmission means; and motor means, for moving the actuator, has a path of movement from a position normally out of engagement with the actuator teeth to positions operatively engaging the actuator teeth and moving the actuator incrementally in either direction; the motor means including a longitudinally reciprocable pawl mount mechanism supported by the base means for back and forth movement adjacent the toothed actuator; pawls spaced apart in the direction of movement carried by the mount mechanism for movement relative to the mount mechanism in a path generally transverse to the back and forth movement of the pawl mount mechanism toward and away from the actuator teeth; and control means for automatically determining which of the pawls engages an actuator tooth according to the longitudinal position of the mount.

6. The improved combination of claim 5 in which the pawls are pivotally mounted on said mount; biasing means normally urges the pawls to pivot toward the actuator teeth; and the control means comprises similarly spaced apart cam surfaces supported by the base means, each of which pivots one of the pawls in a direction away from the actuator teeth when the mount is moved in a direction toward the cam surface, while the other pawl is permitted to pivot into engagement with an actuator tooth and to move the actuator an increment with continued movement of the mount.

7. The improvement combination of claim 6 in which the motor includes a piston-cylinder assembly normally maintaining the mount in a position such that each pawl is engaged with a cam surface and is held out of engagement with the actuator.

8. The improved combination of claim 7 in which the piston-cylinder assembly includes a main cylinder mounting a tubular piston and an inner piston on which the mount is carried is provided within the tubular piston; there being port means communicating with opposite ends of the tubular piston and the inner piston permitting the application of a differential pressure to move the mount in either direction.

9. The improved combination of claim 8 in which stop means associated with the tubular piston and the inner piston prevent movement of the actuator of more than one tooth in extent.

10. In a tool arm assembly having a longitudinally extending base means adapted to be supported on a machine tool adjacent a workpiece rotating spindle, a tool carrier means mounted on the base means and having a position adjustable portion adapted to support the tool; and motion transmission means operatively connected to adjust the position of the position adjustable portion relative to the base means and spindle and thereby adjust the position of the tool relative to the workpiece;

the improvement wherein a multi-toothed, bi-directional actuator, movable in precise increments in opposite directions, is provided on the assembly to operate the motion transmission means; motor means, for moving the actuator, has a path of movement from a position normally out of engagement with the actuator teeth to positions operatively engaging the actuator teeth and moving it incrementally in either direction; the motor means includes a reciprocable pawl mount supported by the base means for back and fourth movement adjacent the toothed actuator; pawls spaced apart in the direction of movement are carried by the mount; control means are provided for determining which of the pawls engages an actuator tooth dependent on the position of the mount; the pawls being pivotally mounted on said mount, biasing means normally urges the pawls to pivot toward the actuator teeth; and the control means comprises similarly spaced apart cam surfaces supported by the case means, each of which pivots one of the pawls in a direction away from the actuator teeth when the mount is moved in a direction toward the cam surface, while the other pawl is permitted to pivot into engagement with an actuator tooth and to move the actuator an increment with continued movement of the mount.

11. The improved combination set forth in claim 10 wherein the actuator comprises a ratchet wheel on a shaft assembly carried crosswisely on the base means; and the shaft assembly includes a threaded member with opposing ends engaging the deformable portion so as to be capable of deforming it in a lateral direction and shifting the radial position of the tool.

12. The improved combination of claim 10 in which the motor includes a piston-cylinder assembly normally maintaining the mount in a position such that each pawl is engaged with a cam surface and is held out of engagement with the actuator.

13. The improved combination of claim 12 in which the piston-cylinder assembly includes main cylinder mounting a tubular piston and an inner piston on which the mount is carried is provided within the tubular piston; there being port means commuiating with opposite ends of the tubular piston and the inner piston permitting the application of a differential pressure to move the mount in either direction.

* * * * *